Figure 1:
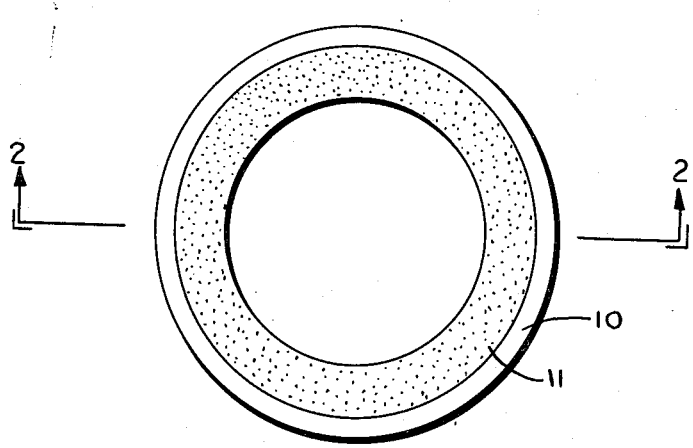

March 5, 1957     K. C. NICHOLSON     2,784,112
METHOD OF MAKING SILICON CARBIDE-BONDED REFRACTORY
BODIES AND COATED METAL ARTICLES
Filed May 17, 1952

INVENTOR.
K. C. NICHOLSON
BY
ATTORNEY

United States Patent Office 2,784,112
Patented Mar. 5, 1957

2,784,112

METHOD OF MAKING SILICON CARBIDE-BONDED REFRACTORY BODIES AND COATED METAL ARTICLES

Kenneth C. Nicholson, Niagara Falls, N. Y., assignor, by mesne assignments, to The Carborundum Company, Niagara Falls, N. Y., a corporation of Delaware Application May 17, 1952, Serial No. 288,507

10 Claims. (Cl. 117—65)

This invention relates to novel refractory articles of manufacture and to methods for making them. More specifically, it relates to an improved method for making refractory bodies in which silicon carbide constitutes the bond of the article, and with or without added refractory filler material, forms the refractory body of the article. It also relates to various novel composite articles of manufacture which can be made by the aforesaid method.

Silicon carbide has long been recognized as an extremely valuable refractory material. Most bonded silicon carbide refractory bodies have been heretofore made by first making the silicon carbide in bulk form in large quantities in a resistance furnace, crushing the silicon carbide to the desired grit size, and, with or without additional bonding material, molding or otherwise forming the granular or pulverized silicon carbide into the desired shape and firing it to mature the bond. Methods have also been advanced for the making of silicon carbide shapes by starting with a body of carbon and subjecting it to a siliconizing treatment at an extremely high temperature to convert the carbon to silicon carbide. Both the above methods of making silicon carbide bodies entail the use of extremely high temperatures. For example, when silicon carbide is made in a conventional silicon carbide furnace the operation is conducted at temperatures well in excess of 2000° C. Similar high temperatures have been required for siliconizing carbon bodies. Obviously, such excessively high temperatures are to be avoided if possible in order to lower the cost of fabrication of any product.

More recently, a C. F. Geiger U. S. Patent No. 2,431,327, issued November 25, 1947, disclosed a method of making silicon carbide-bonded refractory bodies by a process which can be carried out at low temperatures, thereby avoiding the use of the high temperatures required by previous practice. According to the Geiger patent, bonded silicon carbide bodies can be obtained by forming the desired shape from a mixture of silicon metal and carbon in stoichiometric proportions, with or without fillers, and firing the molded shape over a period of several hours at a temperature of from 1200° C. to 1500° C. in a reducing or non-oxidizing atmosphere, such as that obtained by embedding the molded shape in a mass of carbon or coke to exclude oxygen, to react the carbon and silicon contained in the body and form silicon carbide. The method of the Geiger patent offers the advantage over previous prior art practices of eliminating the need for extremely high temperatures for the formation of silicon carbide but is still subject to certain disadvantages. For example, when the teachings of the Geiger patent are followed, the free solid carbon in the unfired shape as well as the carbon present in the embedding mixture combine with any ferrous metals present, such as steel support reinforcing members so that it is unsatisfactory for the making of composite articles of manufacture.

It is an object of the present invention to provide a method of making silicon carbide articles offering all the advantages of the Geiger process and in addition providing several additional advantages thereover.

It is a further object of the present invention to provide a method of making silicon carbide-bonded refractory bodies wherein the refractory body composition can be molded or formed in combination with a metal reinforcing or supporting member and fired in place without damage to the metal element.

It is a further object of the present invention to provide an improved low temperature method of making silicon carbide-bonded refractory bodies.

Other objects and advantages accruing from the present invention will become apparent as the description proceeds.

According to the present invention finely divided silicon together with any particulate or granular refractory filler material which it is desired to constitute a part of the final refractory body and with or without a small amount of a temporary binder is molded to form the desired shape and the molded or formed object dried and fired at a relatively low temperature, namely, from approximately 1200° C. to 1350° C. in a carbonaceous atmosphere for a sufficient length of time to react the silicon with the carbon of the carbonaceous atmosphere and convert the silicon to silicon carbide which serves to bond itself and the particles of refractory filler when such is used and form a strong, solid body. I have obtained very satisfactory results by firing the molded shapes in an atmosphere of carbon monoxide at a temperature of 1350° C. I have discovered most unexpectedly that when firing the molded articles of the aforementioned composition type under such conditions it is only necessary to hold the article at the maximum temperature a very short period of time usually in the neighborhood of from a few minutes to a fraction of an hour to bring about a complete reaction of the silicon to form silicon carbide. The holding time will, of course, vary from article to article depending, inter alia, upon the overall thickness of the refractory body as well as the percentage by weight of silicon in the body. For example, a refractory body composed substantially entirely of silicon metal would require a longer period of time for conversion of the silicon to silicon carbide then an article of the same size and shape composed largely of granular silicon carbide or other refractory filler material with a minor percentage of silicon as the bonding ingredient.

As a result of the relatively low temperatures and short periods of time required for thorough firing of articles and conversion of the silicon to silicon carbide in accordance with the present invention, I have had marked success in making composite articles of manufacture wherein the refractory composition is molded in combination with one or more metallic reinforcing or supporting members and firing the entire assembly to complete maturity of the refractory body without undue detrimental effect upon the metal member or members of the article.

The fact that the present process is conducted in a carbonaceous atmosphere such as an atmosphere of carbon monoxide is further beneficial to the specific application of the process to the making of such composite articles. The present process therefore provides for the first time a method of making new articles of manufacture wherein a refractory body having a silicon carbide bond is provided as a lining or is otherwise supported by a metal shell or casing or other means of backing or support and the resulting refractory material can be formed and fired in combination with the metal element or elements with highly satisfactory results.

The silicon carbide which is formed in carrying out the present process is not the type obtained in the silicon carbide furnace which is conventionally used in the prior art for the making of bulk silicon carbide, wherein a mixture of sand and carbon is packed around an elongated graphite core and is heated to an extremely high temperature, as for example, from 2000° C. to 2600° C. The silicon carbide resulting from such conventional method of manufacture is in the form of either large platy crystals or elongated needle-like crystals, both of which are hexagonal in crystal habit. In the method of the present invention, because of the low temperatures and short periods of time employed, the silicon carbide of which the product is composed wholly or in part, is in the form of a very small crystals, so small in fact that when examined by the naked eye they appear to be amorphous. However, upon examination, as by use of X-ray diffraction patterns, the product is found to be crystallized with a cubic habit.

Figure 2:
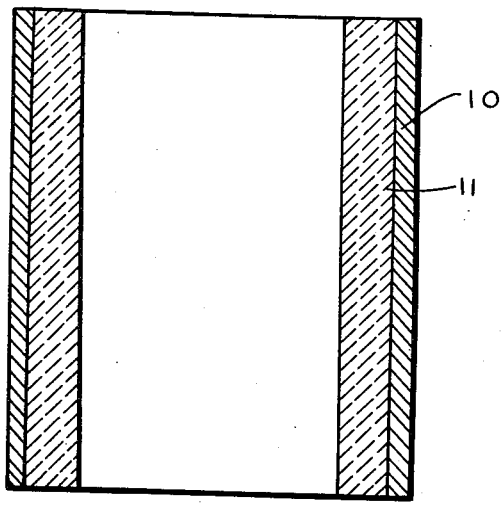

Referring to the figures in the drawing,

Figure 1 is an end view of a rocket motor chamber made in accordance with the present invention in which the steel shell 10 is provided with a silicon carbide-bonded refractory lining 11; and Figure 2 is a sectional view through the line 2—2 of Figure 1.

Although the process has been carried out by forming the desired shape substantially entirely of silicon metal, except for the use of a small amount of a temporary binder, and firing the molded shape to form silicon carbide by the reaction of the silicon with the surrounding carbonaceous atmosphere, it is my usual practice to employ with the silicon a substantial amount of a refractory filler material which is inert at the temperatures of firing of the article and is incorporated initially with the silicon metal in any desired amount. Such filler material may be, for example, ordinary hexagonal silicon carbide of one or more mesh sizes, alumina, mullite, kyanite, or other refractory grain, or it may be a clay. When sufficient clay is used to act as a supplementary bond, as for instance when 20–30% by weight of the product is employed, the product has a mechanical strength and toughness which allow it to withstand especially hard use in the way of mechanical and heat shock.

The refractory filler material can be in conventional granular or pulverized form and can be either a fused and crushed material or a calcined material depending upon its source and method of manufacture. In addition to ordinary granular materials, fillers in other forms may be used such as refractory globules, solid pellets or hollow spheres or in the form of refractory fibers or the like.

Two or more filler materials can be used together. In cases where such filler materials are used, the product consists of such filler uniformly distributed throughout the resulting refractory shape and a bond of interlocked cubic silicon carbide crystals. It is possible, by use of the filler or fillers in varying amounts to modify and predetermine the properties of the refractory body in respect of mechanical strength, coefficient of expansion, heat conductivity, and resistance to thermal shock and endurance under various corrosive and erosive conditions of use. When silicon alone is used the resulting silicon carbide acts as a self-bonding material with the minute crystals closely interlocked so that the product has a very high mechanical strength.

The cubic silicon carbide formed as a result of the reaction between the carbon of the carbon monoxide or other carbonaceous atmosphere and the silicon contained in the body of the formed shape bonds itself and the filler material, if such is used, into a strong coherent mass by reason of the interlocking of the cubic silicon carbide crystals with each other and granular filler, and by reason of the at least partial interdiffusion between adjacent cubic silicon carbide crystals. When the refractory is used in a neutral or non-oxidizing atmosphere at temperatures above that at which it was formed, it is self-strengthening, since such temperature will further the interdiffusion between silicon carbide crystals. If such temperature is high enough, the cubic silicon carbide changes partially or wholly to hexagonal silicon carbide with the crystals strongly interlocked or joined. The product of the present invention is therefore self-strengthening under high temperature operating conditions.

Moreover, the reaction between the carbon monoxide or other carbonaceous atmosphere and the silicon in the article being fired is relatively rapid so that the formation of silicon carbide through such reaction takes place at such a rate that it is unnecessary to maintain the article being fired at the maximum firing temperature for a prolonged period of time. The reaction usually takes place in a matter of minutes.

The process of the present invention is carried out as follows: the components of the mixture from which the refractory body is to be composed, as for example, finely divided silicon and, when conventional silicon carbide of granular form is to be used as an added filler, the silicon carbide filler in the desired grit size, are mixed for a long enough time to insure uniform distribution of the components of the mixture. In order to permit the mixture to be molded and handled prior to burning, a small amount of a temporary binder is usually included. Any of the usual and well-known temporary binders of both dry and liquid form, such as various resins, dextrine, lignone, bentonite, waxes, stearates and the like may be used alone or in workable combinations. The mix is then formed by any of the usual forming methods, as by pressure molding, after which the shapes are slowly dried in an oven at moderate temperature. After drying, the shapes are fired in a kiln in the presence of a carbonaceous atmosphere such as an atmosphere of carbon monoxide.

The heating cycle employed for such firing operations is subject to some variation. Naturally, the cycle should be such as to heat the shapes up to the maximum temperature gradually enough to prevent their being cracked. The shapes are then held at a peak temperature of from 1200° C. to 1350° C., or above, for a period of time sufficient to insure complete reaction between the silicon metal in the body and the carbon of the carbonaceous atmosphere. No definite figures can be given for the length of holding of the product at a maximum temperature since this obviously depends to some extent upon the temperature of firing, the size and shape of the article and the proportion of silicon within the body. However, the holding period at maximum temperature is usually a matter of minutes. For example, in making a setter tile approximately ¾" in thickness it has been found satisfactory to heat the product from room temperature to approximately 1250° C. at the rate of 200° C. per hour and holding at the maximum temperature for a period of 15 minutes after which the article is slowly cooled to room temperature.

When it is desired to make a composite refractory article of manufacture embodying a refractory silicon carbide-bonded composition of the herein described type in combination with a metal support or backing, such as, for example, the provision of such a refractory composition as a lining within an outer cylindrical steel shell or casing, a mixture of the desired constituents is prepared in the usual manner and tamped or otherwise molded into position within the steel shell or otherwise secured to the metallic element which is to constitute a part of the finished article, and the resulting composite article dried in the usual manner. The thusly prepared piece is then placed in the kiln or furnace and fired in accordance with the same procedure used for firing shapes molded from the same refractory composition alone. The short period of holding time at maximum temperature and the fact that the articles are fired in an atmosphere of carbon monoxide or other carbonaceous atmosphere insures or protects the metal shell or other metallic element from deterioration during the firing schedule.

For purposes of illustration only, not in any way to be considered as restricting the invention, the following examples are typical of mixtures falling within the scope of my invention and representative of the type of articles which can be made in accordance with the teachings of the present invention.

*Example I*

Shaped articles such as small nozzles and other articles composed substantially entirely of silicon carbide in accordance with the teachings of the present invention have been made from the following mixture:

| | Parts by weight |
|---|---|
| 14–36 mesh size silicon carbide | 45 |
| 40–70 mesh size silicon carbide | 13.5 |
| 80 and finer silicon carbide | 31.5 |
| Silicon metal power | 10 |
| Dry lignone | 4 |
| Bentonite gel (1 part bentonite to 4 parts water) | 5 |

After thorough mixing, the nozzles and other shapes were molded under pressure at 50,000 pounds per square inch and dried at approximately 200° F. after which the resulting articles were fired in a carbon monoxide atmosphere to a maximum temperature of 1350° C. In firing the articles were placed in a furnace and the temperature gradually raised at the rate of approximately 200° C. per hour to maximum of 1300° C. and held at peak temperature for only 15 minutes, after which the furnace was allowed to cool down. A flowing stream of carbon monoxide was maintained in the furnace during the entire firing schedule.

The resulting articles were hard and mechanically strong and were composed of hexagonal silicon carbide bonded with cubic silicon carbide. An oxyacetylene torch test of the bodies showed that they had an extremely high resistance to erosion and cracking from localized heat shock.

*Example II*

Refractory bodies composed of a refractory oxide bonded by a cubic silicon carbide bond were made according to the present invention from the following mixture:

| | Parts by weight |
|---|---|
| Fused alumina, 80 mesh grit size | 85 |
| Silicon metal powder | 15 |
| Powdered phenolic resin | 5 |
| Calcium stearate | 1 |
| Butyl stearate | 5 |

The above ingredients were mixed together to form a molding mixture of pressing consistency and pressed into small shapes at 20,000 pounds per square inch pressure, and dried at a temperature of about 200° F. The dried pieces were then fired in an atmosphere of carbon monoxide gas to a temperature of 1350° C. and held at peak temperature for 15 minutes.

Small bars made and fired as above described showed a gain in weight during the firing operation and the resulting bodies were hard and mechanically strong having a modulus of rupture in the neighborhood of 3500 pounds per square inch. X-ray diffraction analyses of the fired pieces showed a strong pattern for alpha alumina and a secondary pattern of cubic silicon carbide indicating that the alumina particles within the body had been bonded together by an interstitial matrix of cubic silicon carbide crystals.

*Example III*

Rocket motor structures comprising an outer steel shell or casing and a refractory silicon carbide lining having a composition such as that shown in Example I above have been satisfactorily made. For example, I have lined an outer cylindrical steel tube or shell of ¼" wall thickness and 4½" diameter with a ⅜" thick silicon carbide lining by tamping a silicon carbide/silicon mixture such as that of Example I above directly into the steel tube, drying, and firing the composite article in a closed furnace chamber to 1350° C. while passing carbon monoxide through the chamber. The holding period at 1350° C. was only 20 minutes. The total time for the firing of the piece, which was carried out in an electrically heated furnace chamber using silicon carbide resistance heating elements as a heating means, was about 5 hours.

The resulting article had a hard, strong, mechanically intact lining of silicon carbide adhered tightly to the outer steel shell, there being no evidence of shrinking of the silicon carbide away from the steel shell. The steel tube had only a superficial dark colored film on the exposed surface, but appeared otherwise unharmed.

While I have set forth a few specific examples above to show the way in which the present invention can be carried out it is not intended to be limited in any away to those specific examples. For example, the filler may be selected from any desired particle size of material and may vary widely in character as previously pointed out. Furthermore, there is nothing critical in respect of the proportion of filler to silicon metal in the compositions from which the article is made since the amount and character of filler used will depend entirely upon the physical characteristics and nature of the finished article desired and the density of the final object and the ultimate use to which it is to be put.

Also, although I have specified the direct passage of carbon monoxide into the furnace chamber during the firing operation, certain obvious changes can be made without departing from the scope of the present invention. For example, a carbon monoxide atmosphere can be provided by passing oxygen or carbon dioxide over heated charcoal or other reducing means to convert it to carbon monoxide prior to flowing it through the furnace chamber. Other carbonaceous atmospheres which will provide an adequate source of carbon for the formation of silicon carbide within the fired article without the introduction of other reactive gaseous constituents can be used, such as methane or other hydrocarbon gases.

Having described the invention it is desired to claim:

1. The process of making bonded refractory articles in which the bond is cubic silicon carbide comprising forming a mix composed essentially of powdered silicon and an inert refractory filler together with a temporary binder to render the mixture workable, forming the mixture to shape, drying the shape, and firing it in a gaseous carbonaceous atmosphere within the temperature range of 1200° C.–1400° C. for sufficient time to react the silicon in said shape with the carbon of said carbonaceous atmosphere to form cubic silicon carbide and thereby bond the material of said shape into a strong solid body.

2. The process of making bonded refractory articles in which the bond is cubic silicon carbide comprising forming a mix composed essentially of powdered silicon and an inert refractory filler together with a temporary binder to render the mixture workable, forming the mixture to shape, drying the shape, and firing it in an atmosphere of carbon monoxide within the temperature range of 1200° C.–1400° C. for sufficient time to react the silicon in said shape with the carbon of said carbon monoxide to form cubic silicon carbide and thereby bond the material of said shape into a strong solid body.

3. The process of making bonded silicon carbide articles in which the bond is cubic silicon carbide which comprises forming an article of the desired shape containing powdered silicon together with sufficient temporary binder to impart "green" strength to the molded shape, drying the shape, and firing it in a gaseous carbonaceous atmosphere within the temperature range of 1200° C.–1400° C. for sufficient time to react the silicon in said shape with the carbon of said carbonaceous atmosphere to form cubic silicon carbide and thereby bond the material of said shape into a strong solid body.

4. The process of making bonded refractory articles in which the bond is cubic silicon carbide comprising forming a mix composed essentially of powdered silicon and an inert refractory filler, forming the mixture to shape, drying the shape, and firing it in a gaseous carbonaceous atmosphere within the temperature range of 1200° C.–1400° C. for sufficient time to react the silicon in said shape with the carbon of said carbonaceous atmosphere to form cubic silicon carbide and thereby bond the material of said shape into a strong solid body.

5. The process of making bonded refractory articles in which the bond is cubic silicon carbide comprising forming a mix composed essentially of powdered silicon and granular silicon carbide of hexagonal crystal habit, forming the mixture to shape, drying the shape, and firing it in a gaseous carbonaceous atmosphere within the temperature range of 1200° C–1400° C. for sufficient time to react the silicon in said shape with the carbon of said carbonaceous atmosphere to form cubic silicon carbide and thereby bond the material of said shape into a strong solid body.

6. The process of making bonded refractory articles in which the bond is cubic silicon carbide comprising forming a mix composed essentially of powdered silicon and a refractory oxidic material, forming the mixture to shape, drying the shape, and firing it in a gaseous carbonaceous atmosphere within the temperature range of 1200° C.–1400° C. for sufficient time to react the silicon in said shape with the carbon of said carbonaceous atmosphere to form cubic silicon carbide and thereby bond the material of said shape into a strong solid body.

7. The process of making bonded refractory articles in which the bond is cubic silicon carbide comprising forming a mix composed essentially of powdered silicon and a refractory oxide, forming the mixture to shape, drying the shape, and firing it in a gaseous carbonaceous atmosphere within the temperature range of 1200° C.–1400° C. for sufficient time to react the silicon in said shape with the carbon of said carbonaceous atmosphere to form cubic silicon carbide and thereby bond the material of said shape into a strong solid body.

8. The process of making bonded refractory articles in which the bond is cubic silicon carbide comprising forming a mix composed essentially of powdered silicon and an inert refractory filler, forming the mixture to shape, drying the shape, and firing it in a gaseous carbonaceous atmosphere within the temperature range of 1200 C. to 1400° C. for sufficient time to react the silicon in said shape with the carbon of said carbonaceous atmosphere to form cubic silicon carbide and thereby bond the material of said shape into a strong solid body.

9. A method according to claim 4 in which the refractory body is formed upon a permanent metal supporting member and is fired in place thereon.

10. A method according to claim 4 in which the refractory body is formed as a lining in a permanent metal shell and is fired in place therein.

References Cited in the file of this patent

UNITED STATES PATENTS

| | | |
|---|---|---|
| 628,288 | Talbot | July 4, 1899 |
| 1,084,199 | Egly | Jan. 13, 1914 |
| 2,003,625 | Boyer | June 4, 1935 |
| 2,190,050 | Tracy | Feb. 13, 1940 |
| 2,431,327 | Geiger | Nov. 25, 1947 |
| 2,487,581 | Palumbo | Nov. 8, 1949 |

FOREIGN PATENTS

| | | |
|---|---|---|
| 54,566 | Switzerland | 1910 |
| 53,533 | Austria | 1912 |
| 632,247 | Great Britain | 1949 |